(12) United States Patent
Johnson et al.

(10) Patent No.: US 11,001,946 B2
(45) Date of Patent: May 11, 2021

(54) KNITTED DURABLE FABRICS FOR USE ON VEHICLE SEATS

(71) Applicant: GM Global Technology Operations LLC, Detroit, MI (US)

(72) Inventors: Nancy L. Johnson, Northville, MI (US); Janet C. Robincheck, Sterling Heights, MI (US); Anthony L. Smith, Troy, MI (US); Marie A. Powers, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 242 days.

(21) Appl. No.: 16/100,313

(22) Filed: Aug. 10, 2018

(65) Prior Publication Data
US 2020/0047453 A1 Feb. 13, 2020

(51) Int. Cl.
*D04B 1/22* (2006.01)
(52) U.S. Cl.
CPC ............ *D04B 1/22* (2013.01); *D10B 2505/12* (2013.01)
(58) Field of Classification Search
CPC ... D04B 1/22; D04B 1/14; D04B 1/16; D04B 7/24; D04B 7/28
See application file for complete search history.

(56) References Cited

U.S. PATENT DOCUMENTS

| | | | | |
|---|---|---|---|---|
| 4,405,686 A * | 9/1983 | Kuroda | .................. | D01D 5/253 264/177.13 |
| 5,027,618 A * | 7/1991 | Robinson | ................. | D04B 1/22 66/202 |
| 5,209,084 A * | 5/1993 | Robinson | ............... | D04B 1/102 66/196 |
| 5,213,863 A * | 5/1993 | Day | ........................ | D04B 1/22 428/68 |
| 5,215,807 A * | 6/1993 | Day | ........................ | D02G 3/32 428/193 |
| 5,235,826 A * | 8/1993 | Brooks | .................... | D04B 1/22 297/452.58 |
| 5,255,538 A * | 10/1993 | Day | ....................... | D04B 1/102 66/196 |
| 5,267,454 A * | 12/1993 | Gregory | .................. | D04B 1/10 442/312 |
| 5,326,150 A * | 7/1994 | Robinson | ................. | D04B 1/22 297/218.2 |

(Continued)

FOREIGN PATENT DOCUMENTS

| | | |
|---|---|---|
| CN | 1965118 A | 5/2007 |
| CN | 204530109 U | 8/2015 |
| CN | 108221151 A | 6/2018 |

OTHER PUBLICATIONS

First Office Action for Chinese Application No. 201910480263.X dated Sep. 27, 2020; 7 pages.

*Primary Examiner* — Danny Worrell

(57) ABSTRACT

A knitted fabric for use on a vehicle seat includes a plurality of interconnected loops of yarn forming a repeating stitch pattern including a plurality of transversely-oriented courses and a plurality of longitudinally-oriented wales, wherein each loop of the plurality of loops in a first course of the plurality of courses is positioned in contact with an adjacent loop in the first course of the plurality of courses. The yarn is a flat yarn including at least two plies, each ply having a ply twist of at least three turns per inch and the yarn is characterized by an overall twist of at least eight turns per inch. A stitch density of the knitted fabric is greater than twelve wales per inch.

15 Claims, 9 Drawing Sheets

(56) References Cited

U.S. PATENT DOCUMENTS

| | | | | |
|---|---|---|---|---|
| 5,428,969 | A * | 7/1995 | Day | D04B 1/12 66/202 |
| 5,577,398 | A * | 11/1996 | Jeffcoat | B60N 2/5891 66/64 |
| 5,626,037 | A * | 5/1997 | Jeffcoat | D04B 1/22 66/170 |
| 5,682,771 | A * | 11/1997 | Forest | B60N 2/58 66/198 |
| 5,711,168 | A * | 1/1998 | Proctor | D04B 1/22 66/189 |
| 5,711,169 | A * | 1/1998 | Leeke | B60N 2/5833 66/196 |
| 5,802,882 | A * | 9/1998 | Girard | D04B 1/22 66/170 |
| 5,887,452 | A * | 3/1999 | Smith | B60N 2/5825 66/170 |
| 6,151,926 | A * | 11/2000 | Leeke | D04B 1/22 66/170 |
| 6,397,638 | B1 * | 6/2002 | Roell | D04B 1/16 66/61 |
| 6,886,369 | B2 * | 5/2005 | Fukuro | D01D 5/253 66/202 |
| 8,276,405 | B2 * | 10/2012 | Ogata | D04B 1/16 66/171 |
| 2008/0020173 | A1 | 1/2008 | Fukunaga et al. | |
| 2014/0000319 | A1 * | 1/2014 | Mueller | D04B 1/22 66/191 |
| 2016/0263857 | A1 * | 9/2016 | Mueller | D04B 1/102 |
| 2018/0170224 | A1 | 6/2018 | Kim et al. | |
| 2019/0194843 | A1 * | 6/2019 | Alexander | B32B 5/26 |
| 2020/0017006 | A1 * | 1/2020 | Booth | B29C 51/12 |
| 2020/0047453 | A1 * | 2/2020 | Johnson | D02G 3/28 |

* cited by examiner

KNITTED DURABLE FABRICS FOR USE ON VEHICLE SEATS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to knitted durable fabrics for use on vehicle seats.

Seat trim covers for vehicle seats can be made of knitted fabrics. Such seat trim covers are installed over the internal structure and foam of the vehicle seat to result in an aesthetically pleasing and comfortable seating surface. The knitted fabrics used in seat trim covers include repeated patterns of interlocking loops of yarn to create the seating surface.

The seat trim covers need to be able to withstand the repeated forces that are exerted on the seating surfaces of the vehicle seats. Occupants are repeatedly entering and exiting vehicles and place various objects on vehicle seats. The occupants, and the clothing that an occupant may wear, present an abusive surface that slides across the surface of vehicle seats. Similarly, briefcases, purses, backpacks, child seats, luggage and other objects that are placed on vehicle seats also present abusive surfaces that are repeatedly pressed and/or slid across the surface of vehicle seats. The knitted fabrics used on vehicle seats need to maintain an aesthetically pleasing appearance despite this abusive environment.

SUMMARY

In one example in accordance with the present disclosure, a knitted fabric for use on a vehicle seat includes a plurality of interconnected loops of yarn forming a repeating stitch pattern including a plurality of transversely-oriented courses and a plurality of longitudinally-oriented wales, wherein each loop of the plurality of loops in a first course of the plurality of courses is positioned in contact with an adjacent loop in the first course of the plurality of courses. The stitch density of the knitted fabric is greater than or equal to twelve wales per inch.

In one aspect, the yarn has an aspect ratio defined by a cross-sectional height of the yarn divided by a cross-sectional width of the yarn and the aspect ratio is greater than or equal to four.

In another aspect, the yarn includes two or more plies twisted together in a twist pattern in which each plie of the two or more plies wraps at least three times around the other plies of the two or more plies per longitudinal inch of the yarn.

In another aspect, the yarn is a covered yarn including a core ply and a cover ply, the cover ply twisted around the core ply at least eight times per longitudinal inch of the yarn.

In another aspect, the cover ply is a flat yarn that includes a plurality of cover filaments.

In another aspect, the core ply includes a plurality of core filaments, the plurality of core filaments including less than 68 core filaments.

In another aspect, the plurality of core filaments are twisted around each other with a ply twist greater than or equal to three turns per longitudinal inch.

In another aspect, the cover ply has a width that is five times greater than a height of the cover ply.

In another aspect, the yarn has a linear mass density of greater than or equal to 300 denier.

In another aspect, each loop of the interconnecting loops in the repeating stitch pattern has a stitch length and the stitch length of each loop in a first course of the plurality of courses varies less than ten percent from other stitch lengths of other loops in the first course of the plurality of courses.

In another aspect, the stitch density includes at least twelve courses per inch.

In another aspect, the repeating stitch pattern comprises a Milano-type rib stitch pattern.

In another aspect, the repeating stitch pattern comprises an interlock stitch pattern.

In another aspect, the yarn includes two plies with linear mass densities of at least 150 denier that are twisted together and each ply includes at least 34 filaments.

In another example in accordance with the present disclosure, a knitted fabric for use on a vehicle seat includes a plurality of interconnected loops of yarn forming a repeating stitch pattern including a plurality of transversely-oriented courses and a plurality of longitudinally-oriented wales, wherein each loop of the plurality of loops in a first course of the plurality of courses is positioned in contact with an adjacent loop in the first course of the plurality of courses. The yarn is a flat yarn including at least two plies, each ply having a ply twist of at least three turns per inch and the yarn is characterized by an overall twist of at least eight turns per inch. A stitch density of the knitted fabric is greater than twelve wales per inch.

In an example method of producing a knitted fabric for use on a vehicle seat cover in accordance with the present disclosure, the method includes loading yarn into a knitting machine. The knitting machine includes a stitch length adjustment and a take down adjustment. The method also includes adjusting the stitch length adjustment to cause the knitted fabric to have a predetermined stitch density and adjusting the take down adjustment to a minimum necessary take down force. The method further includes regulating the minimum necessary take down force within a tolerance of ten percent.

In one aspect, the predetermined stitch density is at least twelve wales per inch.

In another aspect, the minimum necessary take down force is a force required to extract the knitted fabric from the knitting machine and maintain the predetermined stitch density.

In another aspect, regulating the minimum necessary take down force further includes maintaining a stitch length of interconnected loops in the knitted fabric within a tolerance of ten percent.

In another aspect, the yarn includes two plies with linear mass densities of at least 150 denier that are twisted together and each ply includes at least 34 filaments.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicle seat covers are surfaces that should resist the wear and tear associated with the repeated use by occupants. Such wear and tear includes occupants sitting, sliding or otherwise exerting forces against the vehicle seat covers. Occupants are a variety of weights and sizes and often wear a variety of different types of clothing or accessories that can contact the vehicle seats. When occupants sit or slide on the vehicle seat covers, the occupants' clothing and/or accessories can move across the surfaces of the vehicle seat covers. The zippers, seams, pockets, or other abrasive elements that can be present on the occupants' clothing can be particularly abrasive against the vehicle seat covers. The vehicle seat covers, however, must resist such abusive and abrasive forces and maintain an aesthetically pleasing appearance.

Conventional non-automotive fabrics include stitch patterns, stitch structures and/or are made of yarns that do not withstand the wear and tear of vehicle seats. The knitted fabrics of the present disclosure include stitch patterns, stitch structures and/or are made of yarns that can resist the repeated abusive and abrasive forces by occupants of vehicles.

In one example in accordance with the present disclosure, the knitted fabric includes a stitch pattern with a plurality of interconnected loops that define a series of transversely-oriented courses and a series of longitudinally-oriented wales. The individual loops in the courses that are positioned adjacent to one another are positioned in contact with one another. The stitch pattern includes a stitch density that is greater than or equal to twelve wales per inch of knitted fabric. Such a knitted structure of the knitted fabric withstands the repeated movement of an occupant across the surface of the knitted fabric. The knitted fabrics of the present disclosure maintain an aesthetically pleasing appearance after prolonged and/or repeated use.

While the examples described herein are described in the context of vehicle seats, the knitted fabrics can also be used, for example, in other vehicle trim components (e.g., dashboards, interior door coverings, storage compartments, steering wheels), or in non-vehicle applications such as furniture, clothing, architectural applications, and other consumer products.

Figure 1:
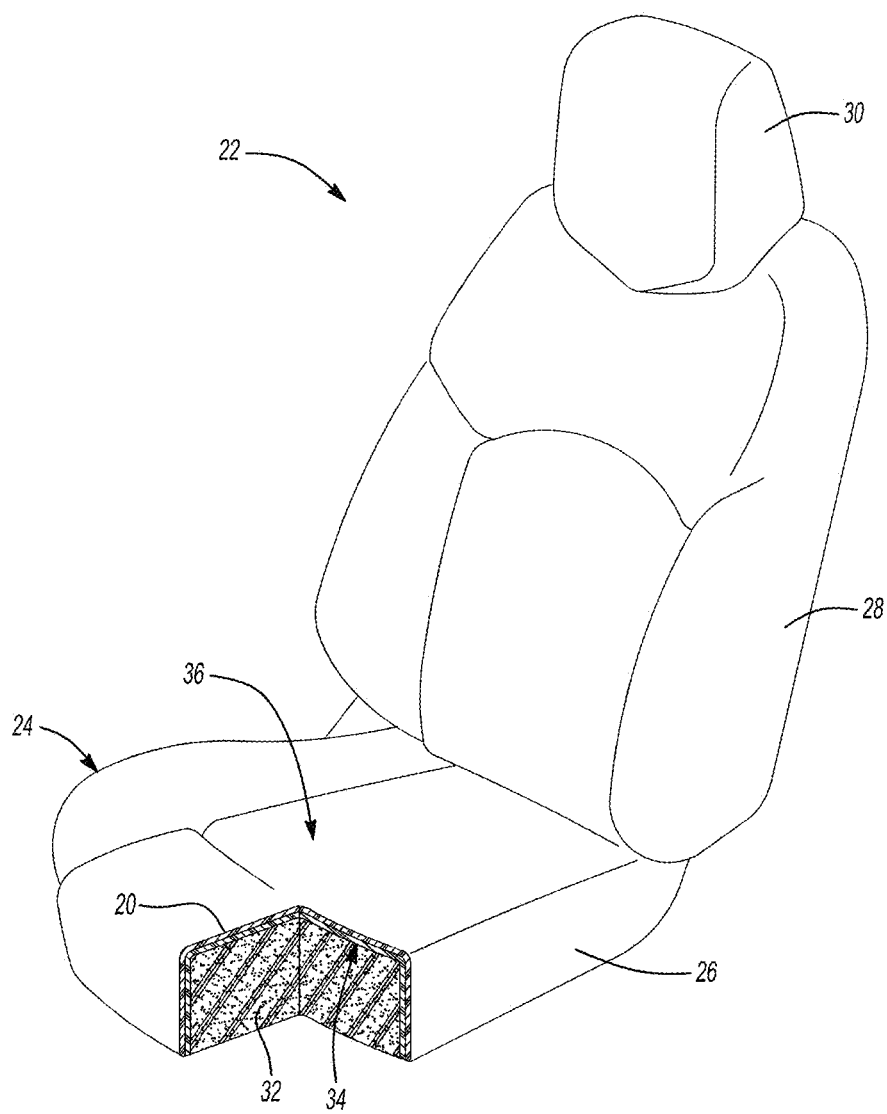
FIG. 1 is a perspective view of a vehicle seat that includes an example knitted fabric in accordance with the present disclosure.

Referring now to FIG. 1, an example knitted fabric 20 is used on a vehicle seat 22. The knitted fabric 20 is knitted to form a knitted seat cover 24. The vehicle seat 22 includes a seat base 26, a seat back 28 and a headrest 30. The knitted seat cover 24 can be integrally knitted to form the various portions of the seat cover 24. Alternatively, one or more portions of the seat cover 24 can be individually knitted and then subsequently stitched or otherwise connected together.

As shown, the knitted seat cover 24 is positioned over one or more internal supports 32 of the vehicle seat 22. In this example, the seat cover 24 is positioned over an internal foam support 32 of the vehicle seat 22. The knitted fabric 20 includes an inwardly-facing surface 34 that faces toward the internal foam support 32 and an externally-facing surface (or A-surface) 36 that faces outward and is positioned on an opposite side of the knitted fabric 20 from the inwardly-facing surface 34. As can be appreciated, as an occupant sits or slides onto the vehicle seat 22, the occupant contacts the externally-facing surface 36. For this reason, the externally-facing surface 36 can be alternatively called the occupant-facing surface 36 in the present disclosure.

The knit fabric 20 can include one layer of knit material or can, alternatively, include two or more layers of material. In the example shown in FIG. 1, the knit fabric 20 includes two layers of material. Such a multi-layer construction can be desirable in particularly abusive environments and/or to improve the performance or appearance of the knit fabric 20.

Figure 2:
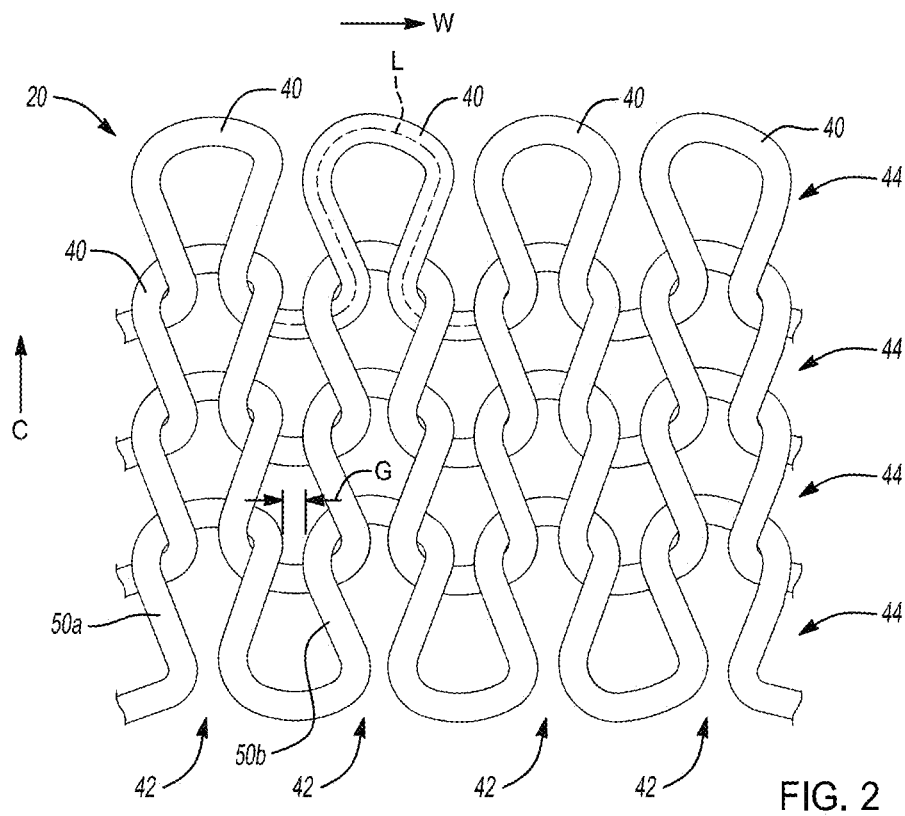
FIG. 2 is an illustration of a stitch pattern of a knitted fabric of the present disclosure.
Figure 3:
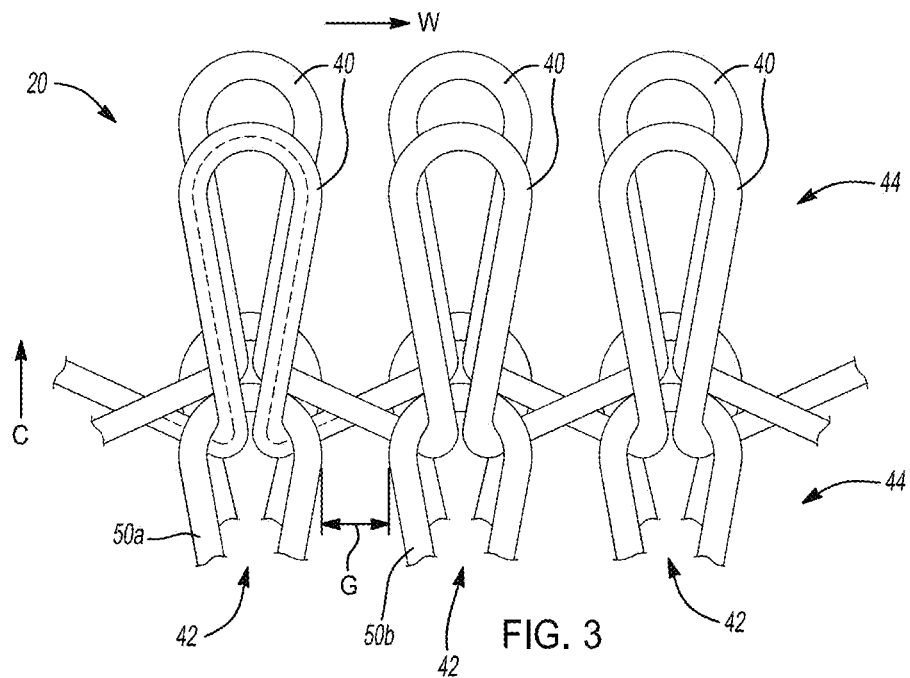
FIG. 3 is an illustration of another stitch pattern of the knitted fabric of the present disclosure.

Referring now to FIGS. 2 and 3, example knit fabrics 20 are depicted demonstrating example knit structures. FIGS. 2 and 3 show different looping structures of the knit fabric 20 but do not necessarily depict the relative sizing or positioning of the multiple loops of yarn of that define the stitch patterns of the knitted fabrics 20 of the present disclosure. As shown, the knit fabric 20 includes a plurality of interlocking loops 40. The plurality of interlocking loops 40 are arranged longitudinally (up and down, as illustrated) and transversely (right and left, as illustrated) to define a series a longitudinally-oriented wales 42 and a series of transversely-oriented courses 44, respectively. In the examples shown, the wales 42 are positioned perpendicularly to the courses 44.

The knitted fabrics 20 can have different stitch patterns. The stitch pattern can be a knitted stitch pattern as shown in FIG. 2 or can be an interlock stitch pattern as shown in FIG. 3. In other examples, the stitch pattern can have other structures such a Milano stitch pattern. As described further below, the stitch pattern preferably includes a tight stitch pattern (e.g., Interlock, Milano) that results in a stitch density that resists the abusive forces that are exerted on the occupant-facing surface 36 of the seat cover 24 when, for example, an occupant slides over the vehicle seat 22 during entry or egress from the vehicle. The knitted fabrics 20 of the present disclosure resist being snagged, ripped or otherwise deformed that results in an unacceptable aesthetic appearance.

Several characteristics of the knitted fabric 20 can be used to identify or describe a suitable stitch pattern that can withstand the repeated abrasive forces of occupants. As shown in FIGS. 2 and 3, a stitch density can be characterized by measuring a quantity of courses 44 that are present in the knitted fabric 20 in longitudinal direction as indicated by the arrow C. The stitch density can be further characterized by measuring a quantity of wales 42 that are present in the knitted fabric 20 in a transverse direction as indicated by the arrow W. The product of the course stitch density and the wale stitch density defines an overall stitch density of the knitted fabric 20. The overall stitch density defines a quantity of individual stitches (or loops) that are present in a square inch of the knitted fabric 20, for example.

Another characteristic of the knitted fabric 20 that can be related to the stitch density of the knitted fabric 20 is a stitch length L. As shown in FIGS. 2 and 3, the stitch length L measures a length of the yarn that creates a single stitch (or loop) in the knitted fabric 20. As can be appreciated, the stitch density of the knitted fabric 20 increases as the stitch length L decreases. In one example, the stitch length L is knitted such that the course density of the knitted fabric 20 is greater than or equal to twelve courses per inch. The illustrations of FIGS. 2 and 3 also depict knitted structures in which adjacent loops 50 in a given course 44 are spaced apart from one another by a gap G. As shown, the adjacent loops 50a and 50b are separated from another in the transverse direction by the gap G. The gap G can be changed, or reduced to zero, to further increase the stitch density of the knitted fabric 20.

Figure 4:
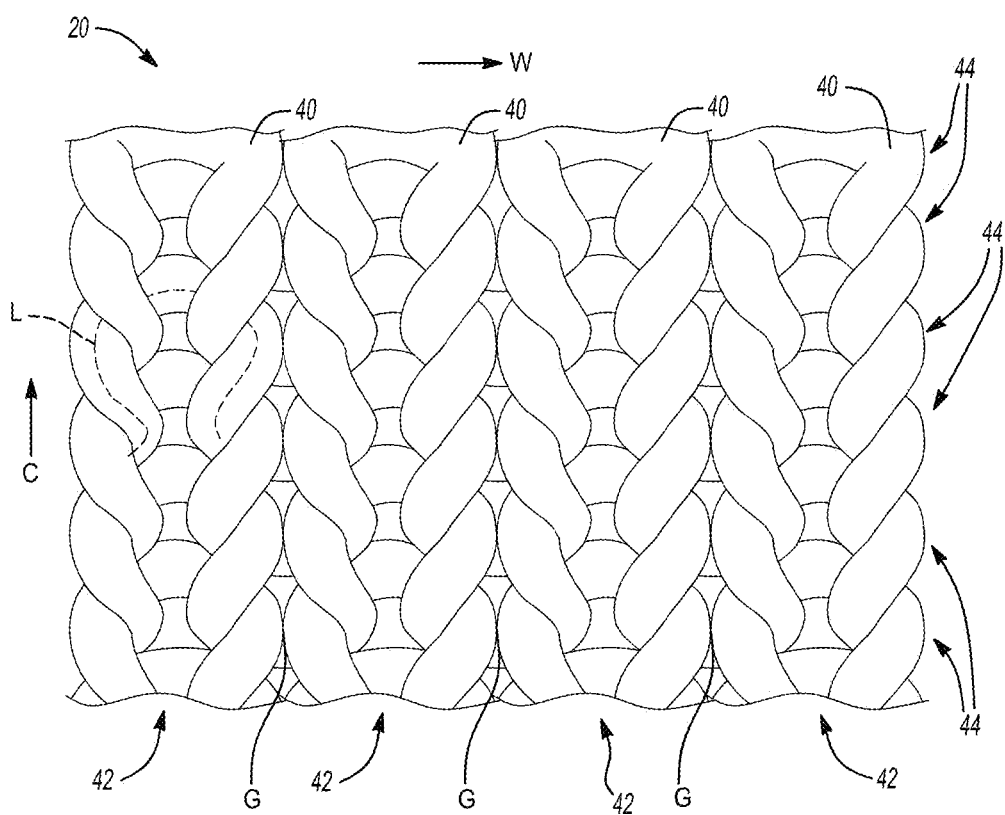
FIG. 4 is a magnified illustration of an example knitted fabric of the present disclosure showing the tightly knitted structure thereof.

Referring now to FIG. 4, an example stitch pattern of the knitted fabric 20 is shown. The stitch pattern of the knitted fabric 20, in this example, has a suitable structure to withstand the repeated abrasive forces exerted by an occupant when the knitted fabric 20 is used on the vehicle seat 22. As can be seen, the stitch pattern of the knitted fabric 20 shown in FIG. 4 is a tightly knitted structure in which each loop 40 in a given course contacts the adjacent loop 40. In the stitch pattern shown, the gap G is reduced to zero. By reducing the gap G to zero, in this example, the knitted fabric 20 includes fewer openings in which a projection from a zipper, pocket, or other structure on an occupant's clothing or on an occupant's accessories can hook the yarn of the knitted fabric 20 and cause a snag, pull, tear, or break. In addition, the reduction of the gap G to zero reduces the surface area of the occupant-facing surface 36 of the knitted fabric 20 that is exposed and is potentially susceptible to snagging, pulling, tearing or breaking.

The knitted fabric 20, as shown in FIG. 4, also has a property in which the stitch length L is consistent across the courses 44. As will be further described, the knitted structure is knitted such that the stitch length L does not vary between loops in a given course by more than fifteen percent. In another example, the stitch length L does not vary between loops in a given course by more than ten percent. Such a consistent stitch length L across the knitted fabric 20 enables the stitch pattern to be a tightly knitted and dense structure as described.

The stitch pattern of the knitted fabric 20, as previously described, results in a suitable stitch density that resists snagging, pulling, tearing and breaking during repeated use. In the example shown, the wale stitch density is a density of at least twelve wales per inch. In another example, the wale stitch density is a density of at least twenty wales per inch.

As can be appreciated, the stitch density as described in the present disclosure is a density of the knitted fabric 20 in a normal operating condition (i.e., as installed, for example, on the vehicle seat 22). The stitch density would change if the knitted fabric 20 was stretched, steamed, washed or otherwise elongated when not in a normal operating condition.

Figure 5:
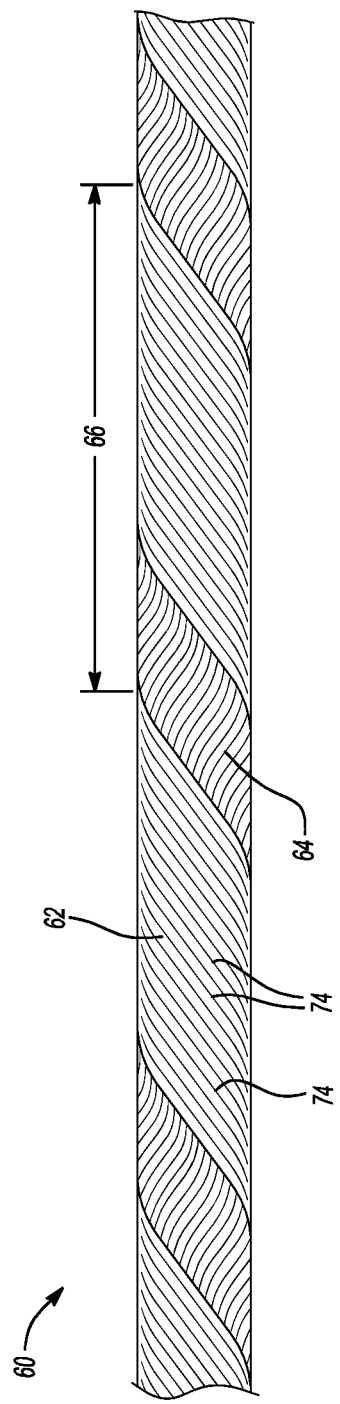
FIG. 5 is a magnified view of a covered yarn that is used in the knitted fabric of FIG. 4.

The knitted fabric 20 is also able to resist snagging, pulling, tearing and breaking due to the structure and properties of the yarn used to create the knitted fabric 20. The yarns used to knit the knitted fabric 20 can include yarns that are made from multiple plies of yarn twisted together. In one example (FIG. 5), the yarn 60 is a 2-ply covered yarn. The yarn 60 includes a cover yarn 62 and core yarn 64. The core yarn 64 is twisted around the cover yarn 62. The amount of twist in the yarn assists in preventing the filaments that make up the core ply cover yarn 62 and/or the core yarn 64 from being snagged, pulled, torn or broken. As shown in FIG. 5, the yarn 60 can have an overall twist of greater than or equal to eight turns per longitudinal inch. In another example, the yarn has an overall twist of greater than or equal to 15 turns per longitudinal inch. In still another example, the yarn has an overall twist of greater than or equal to 17 turns per longitudinal inch. One turn 66 (FIG. 5) of the yarn 60 is defined when the core yarn 64 ply wraps 360 degrees circumferentially around the cover yarn 62.

Figure 6:
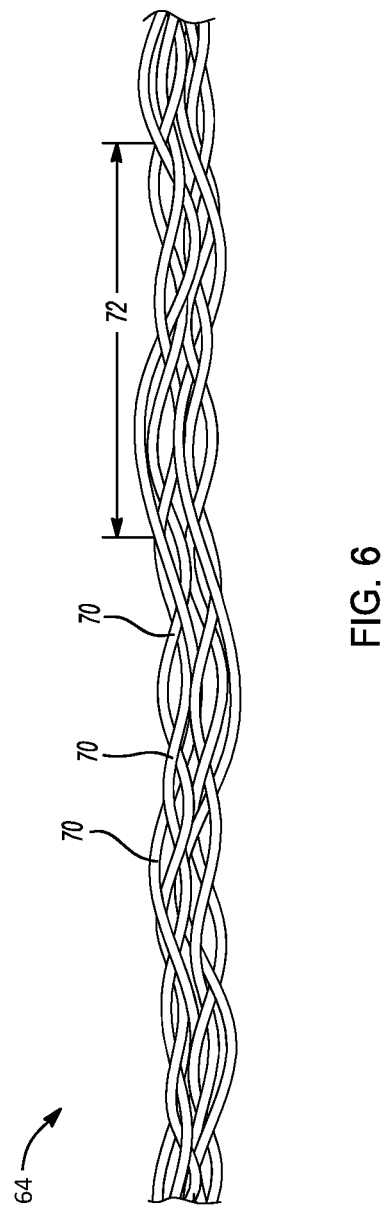
FIG. 6 is a magnified view of one of the plies of the covered yarn of FIG. 5 showing the twisted filaments of the ply.

As shown FIG. 6, the cover yarn 62, in this example, also has a twist. The amount of twist in the cover yarn 62 also improves the yarn's ability to resist snagging, pulls, tears and breaks. The cover yarn 62 is made of multiple individual filaments 70 of material that are twisted together. While any number of filaments 70 can be used, a preferred example includes the cover yarn 62 having less than or equal to 68 filaments 70. In another example, the cover yarn 62 includes less than 50 filaments 70. In still another example, cover yarn 62 includes less than 35 filaments 70. The core yarn 64 be of a similar structure to that described and can include one or more filaments 74. The core yarn 64 can include the same number of filaments 74 as the number of filaments 70 in the cover yarn 62. In other examples, the core yarn 64 has a different number of the filaments 74 than the cover yarn 62.

The cover yarn 62 has a ply twist quantified by a number or turns per longitudinal inch of the cover yarn 62. One turn 72 of the cover yarn 62 is defined when a filament 70 wraps 360 degrees around the other filaments 70. In the example shown in FIG. 6, the cover yarn 62 has a ply twist of greater than or equal three turns per longitudinal inch. In another example, the cover yarn 62 has a twist of greater than or equal to five turns per longitudinal inch. In still another example, the cover yarn 62 has a twist of greater than or equal to eight turns per longitudinal inch.

Figure 7:
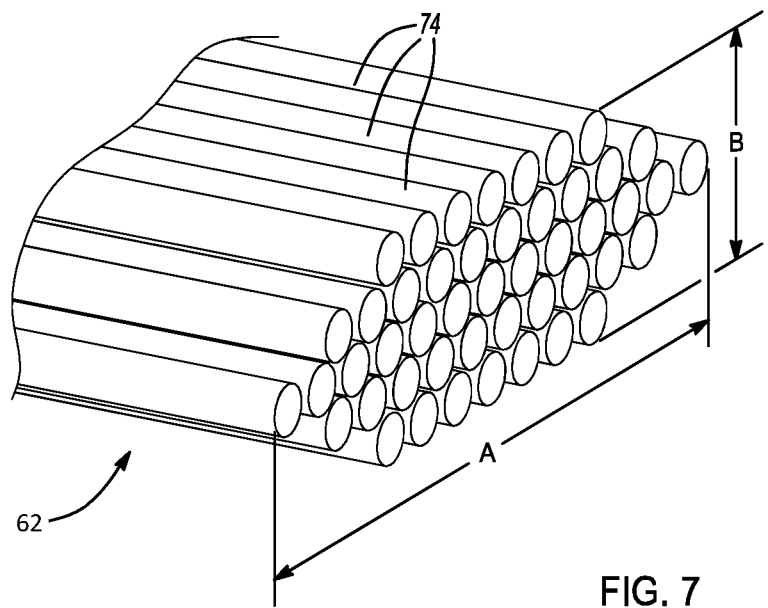
FIG. 7 is an illustration of a cross-section of the cover ply used in the covered yarn of FIG. 5.

The core yarn 64 of the yarn 60, in the example shown, is a flat yarn. As such, the filaments 74 of core yarn 64 are aligned substantially parallel to the axis of the core yarn 64. In this arrangement, the core yarn 64 can have a ribbon cross-sectional shape. As shown in FIG. 7, the cross-section of a flat yarn such as that of the core yarn 64 can have the filaments 74 aligned in a generally parallel arrangement to one another to create a cross-section in which a width A of the core yarn 64 is greater than a height B of the core yarn 64. In one example, the core yarn 64 has a width A that is greater than five times the height B of the core yarn 64. In another example, the core yarn 64 has a width A that is greater than ten times the height B of the core yarn 64. In the example shown in FIG. 7, the cross-section of the filaments 74 is round. In other examples, the cross-sectional shape of the filaments 74 can have other shapes such as flat, trilobal, triangular, etc.

Figure 8:
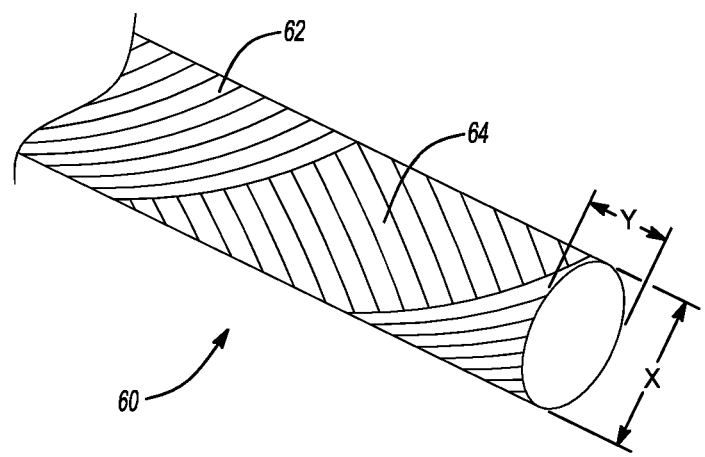
FIG. 8 is an illustration of the overall cross-sectional shape of the yarn of FIG. 5 that is used in the knitted fabric of the present disclosure.

The previously described structure of the yarn 60 results in an overall cross-sectional shape of the yarn 60 as shown, for example, in FIG. 8. The yarn 60, in this example, has an elongated shape in which a width X of the yarn 60 is greater than a height Y of the yarn 60. The width X divided by the height Y defines an overall aspect ratio of the yarn 60. The overall aspect ratio of the yarn 60, in one preferred example, is greater than or equal to two. In another example, the overall aspect ratio of the yarn 60 is greater than or equal to four. In still other examples, the overall aspect ratio of the yarn 60 can have other values, such as, a value at or near one such that the cross-sectional shape of the yarn is circular.

Another characteristic of the yarn 60 that can contribute to the ability of the knitted fabric 20 to resist snagging, pulling, tearing and breaking is the linear mass density of the yarn 60. In one example, the linear mass density of the yarn 60 is greater than or equal to 300 denier. In another example, the linear mass density of the yarn 60 is greater than 500 denier. As can be appreciated, in order to achieve such a linear mass density of the yarn 60 while also maintaining the desirable number of filaments in the yarn 60 (as previously discussed above), the filaments 70 of the yarn 60 may need to be relatively larger than often used in traditional yarns.

Figure 9:
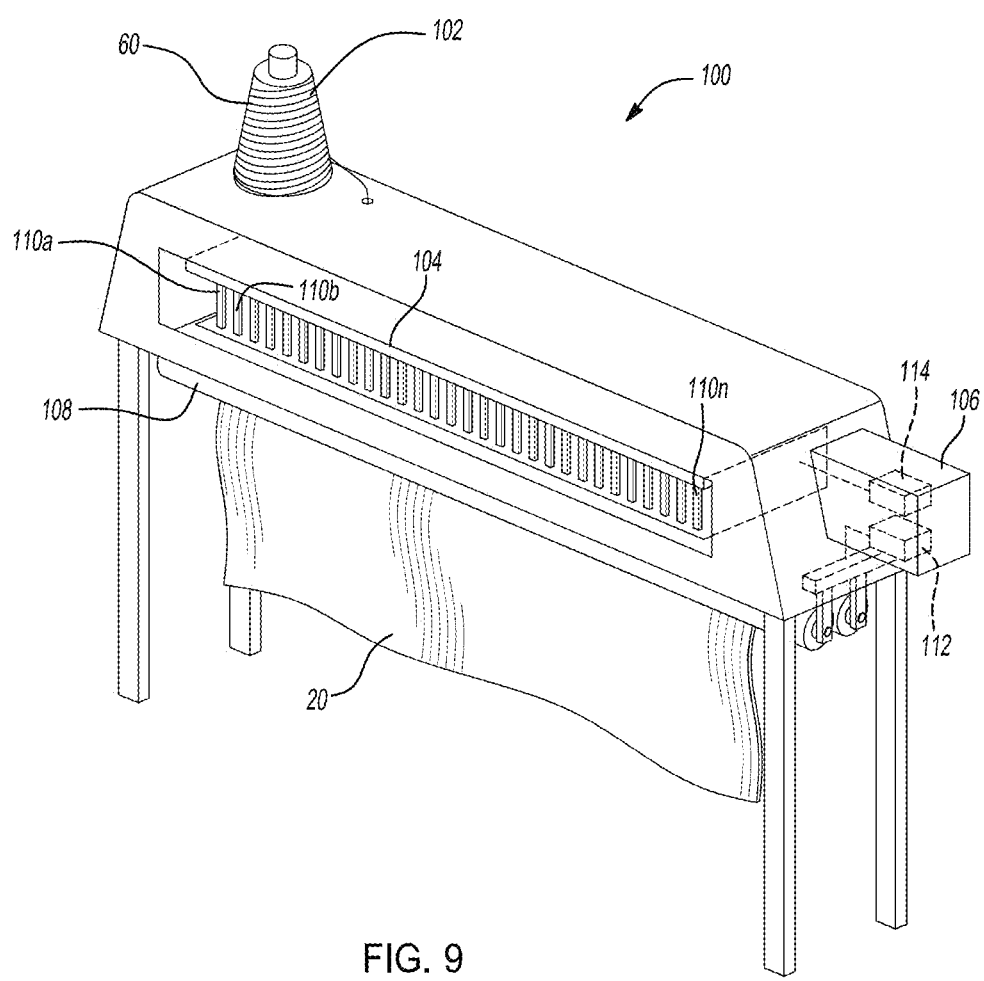
FIG. 9 is an illustration of an example knitting machine that is used to knit the knitted fabrics of the present disclosure.

Referring now to FIG. 9, the yarn 60 is knitted into the knitted structure previously described to create the knitted fabric 20 using a knitting machine 100. The knitting machine 100 can be any suitable knitting machine, such as a Stoll flat bed knitting machine or the like.

An illustration of an example knitting machine 100 is illustrated in FIG. 9. As shown, the knitting machine 100 includes a spindle 102, at least one needle bed 104, a control module 106, and a take down mechanism 108. The yarn 60 can be loaded onto the spindle 102 and fed into the knitting machine 100. The needle bed 104 (or multiple needle beds 104) knits the yarn 60 into the knitted structure of the knitted fabric 20 previously described. The needle beds 104 include a plurality of knitting needles 110a to 110n that each move in the needle beds 104 and, in turn, knits the yarn 60 into the interlocking loop structure of the knitted fabric 20 (FIG. 4).

As shown in the example, the control module 106 is in communication with the take down mechanism 108 and the needle bed 104. The control module 106 includes a stitch length adjustment 114 and a take down adjustment 112. The control module 106 and/or the stitch length adjustment 114 is operable to communicate with a cam mechanism (not shown) on the needle bed 104 to adjust the movement of the needles 110 in the needle bed 104. In this manner, the control module 106 and/or the stitch length adjustment 114 is used by an operator to adjust the stitch length L of the loops 40 in the knitted fabric 20 (FIG. 2).

The control module 106 and/or the take down adjustment 112 is operable to adjust the take down mechanism 108. As can be appreciated, the take down mechanism 108 includes one or more rollers that operate to move the knitted fabric 20 away from the needle bed 104 after the knitting process has been completed. The take down mechanism 108 exerts a force (i.e., a take down force) on the knitted fabric 20. In this manner, the characteristics of the knitted fabric 20 can be maintained and the knitted fabric 20 is extracted from the knitting machine 100.

In various examples of the knitting machine 100, the take down mechanism 108 can include a motor, pneumatic cylinder, solenoid or spring that is in communication with the take down adjustment 112 and/or the control module 106. Such a component can be adjusted to increase or decrease the amount of take down force that is exerted on the knitted fabric 20 as the knitted fabric 20 is extracted from the needle bed 104. In other examples, the take down mechanism 108 can be an adjustable weight and/or comb that can be connected to the knitted fabric 20 to exert a downward force of the knitted fabric 20.

In other examples, the stitch length adjustment 114 and/or the take down adjustment 112 are not included in the control module 106 and are instead separate mechanical assemblies that are coupled to the take down mechanism 108 and the needle bed 104, respectively. In such examples, an operator can mechanically adjust the take down force by moving a lever, dial, set screw or other adjusting element on the knitting machine 100.

Figure 10:
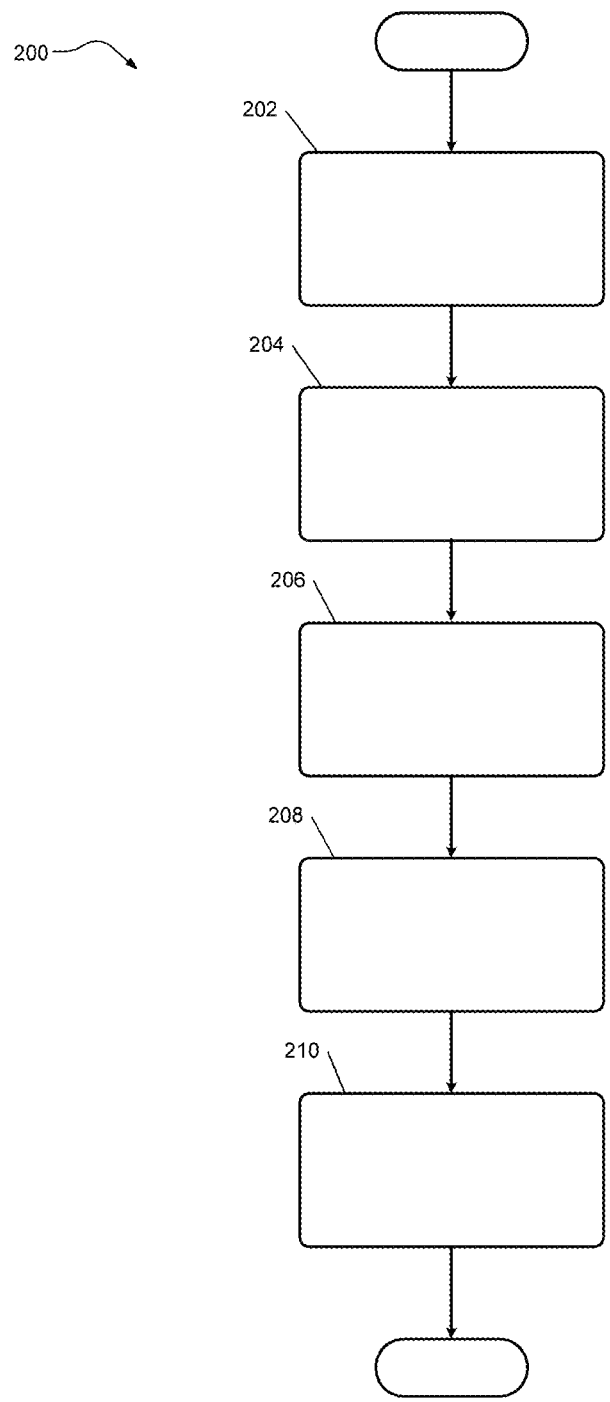
FIG. 10 is a flow chart illustrating an example method of knitting the knitted fabrics of the present disclosure.

As shown in FIG. 10, an example method 200 of knitting the knitted fabric 20 is illustrated. At 202, an operator loads the yarn 60 into the knitting machine. The yarn 60 preferably has the yarn characteristics as previously described (i.e., amount of twist, number of filaments, cross-sectional shape, aspect ratio, linear mass density, etc.). In instances in which multiple yarns 60 are loaded into the knitting machine, it is desirable to twist the ends of the yarn prior to knitting. The twisting of the ends of the yarn prior to knitting minimizes the loose ends of the yarns 60 that may be present on the knitted fabric 20.

At 204, an operator sets or chooses a machine gauge and/or a gauge of the knitting needles 110. The machine gauge and/or the gauge of the needles 110 is chosen based on the desired stitch density of the knitted fabric 20. In one example, the knitted fabric 20 is knitted to have a wale stitch density of twelve wales per inch or greater. In such an example, the machine gauge and/or gauge of the needles 110 is 12 or greater.

At 206, an operator adjusts the stitch length adjustment 114 to achieve a predetermined stitch density. The operator, in one example, can adjust the stitch length adjustment by inputting the predetermined stitch density or other parameter into an input device in communication with the control module 106 and/or the stitch length adjustment 114. In one example, the predetermined stitch density is greater than or equal to 144 stitches per square inch of the knitted fabric 20. In another example, the stitch density in a range of 120 to 180 stitches per square inch. In other examples, other stitch densities can be used.

On a knitting machine 100 such as a Stoll knitting machine, the stitch length adjustment is a cam adjustment or "Np" that defines how far the needle 110 moves down to pull the yarn 60 through the previous stitch to form the loop 40. A smaller Np corresponds to a smaller stitch length, which corresponds to more courses 44 per inch and thusly increases the stitch density. To achieve the predetermined stitch density, the Np settings, in one example, are all adjusted to settings less than 12 with at least one feeder set less than 10. To achieve other stitch densities, other settings can be used.

At 208, the operator adjusts the take down adjustment 112 to a minimum necessary take down force. The operator can adjust the take down adjustment 12, for example, through an input device on the control module 106. The minimum necessary take down force is the minimum force required to extract the knitted fabric from the needle beds 104 while also maintaining the desired stitch length L and/or the predetermined stitch density. As can be appreciated, if the take down force is increased above the minimum necessary take down force, the take down mechanism 108 can pull the knitted fabric 20 and increase the stitch length L such that the stitch density is also increased.

On a knitting machine 100 that is a Stoll knitting machine, the take down adjustment corresponds to a WM setting. On Stoll knitting machines, the take down adjustment 112 is adjusted to a WM setting of less than or equal to 5.

At 210, the operator and/or the control module 106 regulates the take down force to maintain the take down force at or near the minimum necessary take down force. In one example, the control module 106 regulates the take down force by communicating with the take down mechanism 108 to maintain the take down force at the minimum necessary take down force with a tolerance of less than or equal to ten percent. In other examples, the take down force is maintained at other tolerances such that the predetermined stitch density is maintained within a tolerance of ten percent. The control module 106 and/or the operator can monitor the take down force using a force sensor, torque sensor, current sensor or other suitable sensor in order to regulate the take down force at 210.

While not shown in FIG. 10, other steps can be included when knitting the knitted fabric 20. Such other steps can enhance the knitted fabric 20 in resisting snagging, pulling, tearing or breaking. For example, it can be desirable to minimize or eliminate the floating of stitches in the knitted fabric 20, particularly on the occupant-facing surface 36 of the knitted fabric 20. Floated stitches can increase the likelihood that the yarn will be hooked or snagged and can result in an unacceptable aesthetic appearance. Similarly, it is desirable to minimize the exposed surface of the yarn at the occupant-facing surface 36. The tightly stitched and dense structure of the knitted fabric 20 previously described contributes to minimize the exposed surface of the yarn. It is also desirable to use a yarn that has a low texture. Low textured yarns include yarns that have not been processed to include texturing. Such low textured yarns, for example, have not been processed using crimping, air jets, or stuffing techniques.

As explained above, the knitted fabric 20 is used, in one application, on the vehicle seat 22. The knitted fabric 20 is subjected to testing to ensure that the knitted fabric 20 is durable enough for use on the vehicle seat 22. Such a test can simulate the wear and tear of occupants sliding over the surface of the knitted fabric 20. The knitted fabric 20 is deemed suitable for use when the knitted fabric 20 is not aesthetically objectionable after the simulated wear testing.

Figure 11:
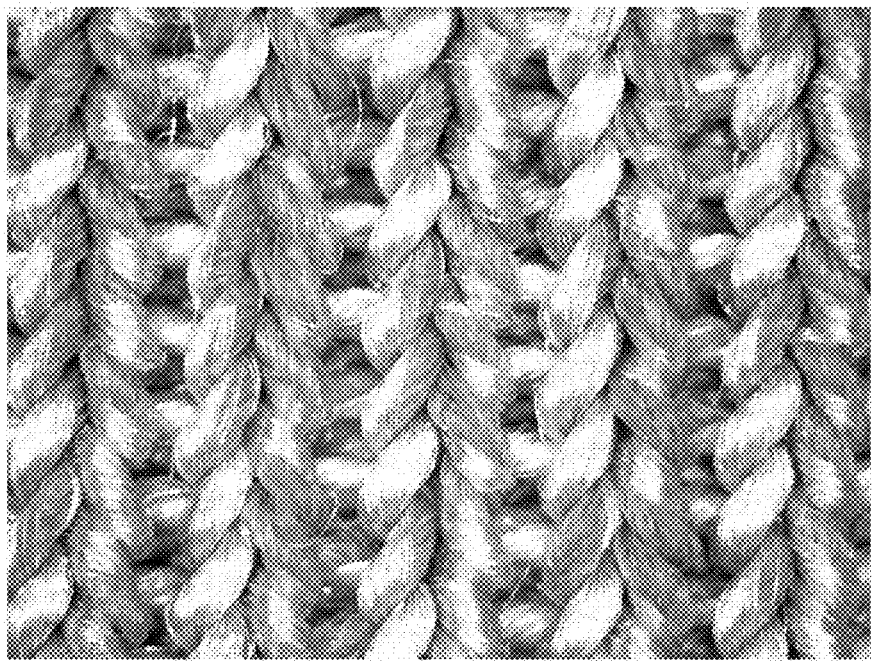
FIG. 11 is a photograph of a knitted fabric of the present disclosure shown prior to wear testing.
Figure 12:
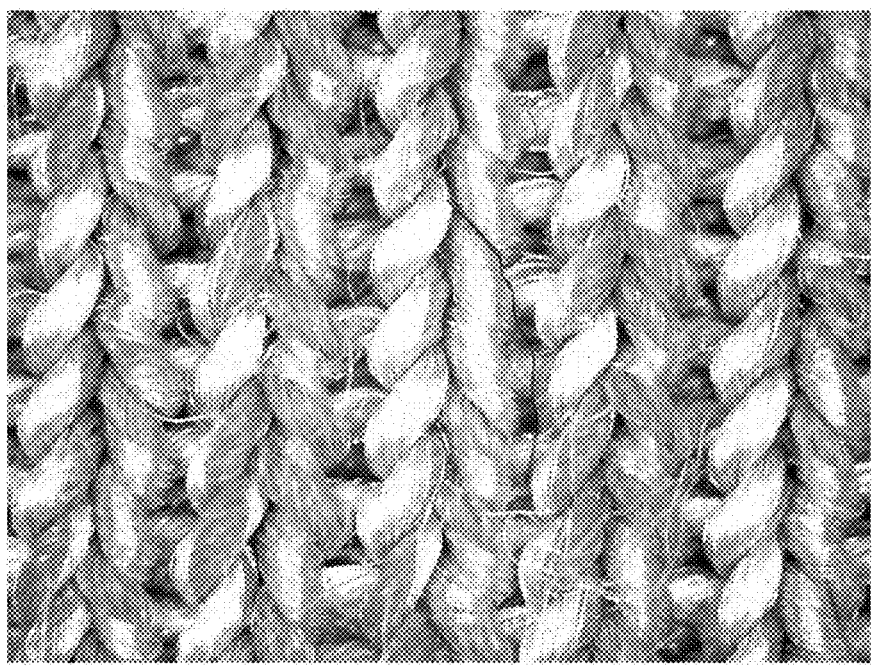
FIG. 12 is a photograph of the knitted fabric of FIG. 11 shown after wear testing that exhibits an acceptable aesthetic appearance.

FIGS. 11 and 12 are photographs showing a suitable example knitted fabric able to withstand the simulated wear testing. FIG. 11 shows the knitted fabric before testing and FIG. 12 shows the knitted fabric after testing. As can be seen, the knitted fabric does not include excessive snagging, pulling, tearing or breaking. The filaments of the yarn remain largely in the knitted structure of the knitted fabric.

Figure 13:
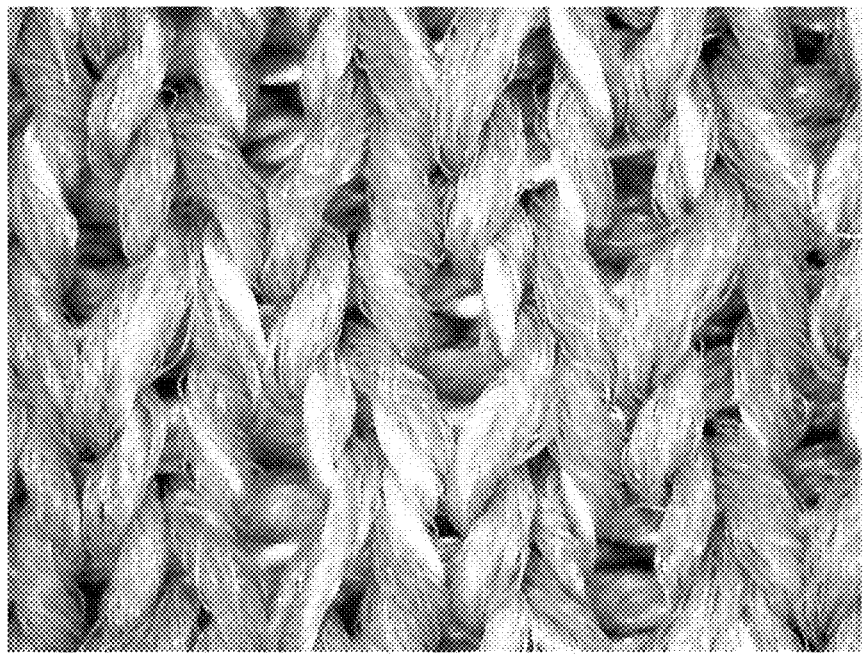
FIG. 13 is a photograph of a traditional knitted fabric shown prior to wear testing.
Figure 14:
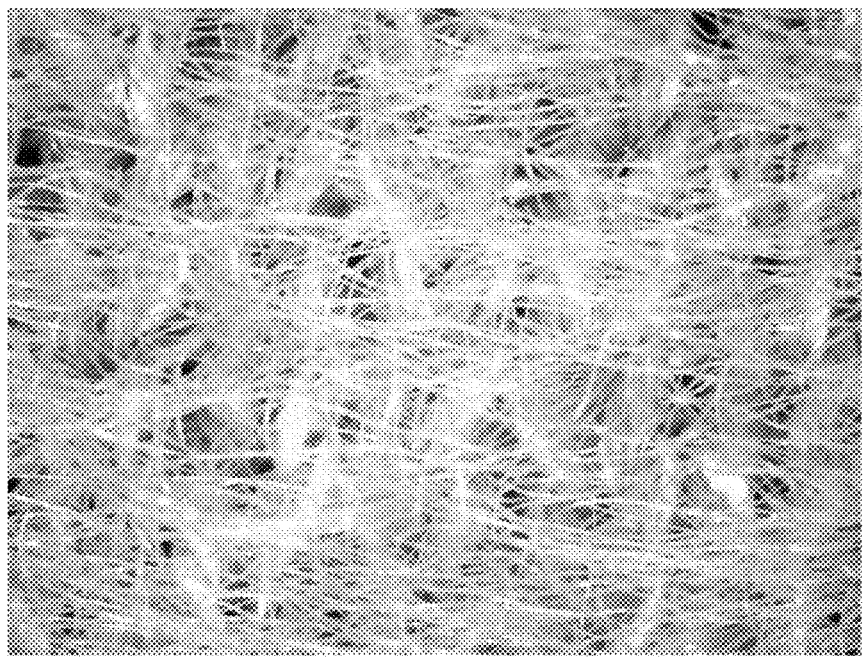
FIG. 14 is a photograph of the traditional knitted fabric of FIG. 13 shown after wear testing that exhibits an unacceptable aesthetic appearance.

In contrast, FIGS. 13 and 14 are photographs showing an unacceptable knitted fabric. FIG. 13 shows the knitted fabric before testing and FIG. 14 shows the knitted fabric after testing. As can be seen, the filaments of the yarn in the knitted fabric have been excessively pulled out of the knitted structure of the knitted fabric after the wear testing. As such, the knitted fabric in FIG. 14 is aesthetically unacceptable for use.

The previously described knitted structure and yarn characteristics of the knitted fabric 20 reduce the likelihood that the filaments of the yarn will be snagged, pulled, torn or broken away from the knitted structure of the knitted fabric 20. An example yarn that has successfully passed the simulated wear testing includes a yarn with the following specifications: 2-ply yarn, (1/300/96 flat, 2/150/34 flat), TPI 10-16. This specification defines a yarn with two plies. The first (or cover) ply is a flat yarn made of one ply with 96 filaments and is 300 denier. The inner (or core) ply is a yarn made of two plies that each have 34 filaments and is 150 denier. The yarn has a twist in the range of 10 to 16 turns per longitudinal inch.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A knitted fabric for use on a vehicle seat comprising:
a plurality of interconnected loops of yarn forming a repeating stitch pattern including a plurality of transversely-oriented courses and a plurality of longitudinally-oriented wales, wherein:
each loop of the plurality of loops in a first course of the plurality of courses is positioned in contact with an adjacent loop in the first course of the plurality of courses;
all adjacent loops of the plurality of loops in the first course of the plurality of courses are positioned in contact with one another at the same time; and
a stitch density of the knitted fabric is greater than or equal to twelve wales per inch.

2. The knitted fabric of claim 1, wherein the yarn has an aspect ratio defined by a cross-sectional height of the yarn divided by a cross-sectional width of the yarn and the aspect ratio is greater than or equal to one.

3. A knitted fabric for use on a vehicle seat comprising:
a plurality of interconnected loops of yarn forming a repeating stitch pattern including a plurality of transversely-oriented courses and a plurality of longitudinally-oriented wales, wherein:
each loop of the plurality of loops in a first course of the plurality of courses is positioned in contact with an adjacent loop in the first course of the plurality of courses;
a stitch density of the knitted fabric is greater than or equal to twelve wales per inch;
the yarn has an aspect ratio defined by a cross-sectional height of the yarn divided by a cross-sectional width of the yarn and the aspect ratio is greater than or equal to one; and
the yarn is a covered yarn including a core ply and a cover ply, the cover ply twisted around the core ply at least eight times per longitudinal inch of the yarn.

4. The knitted fabric of claim 3, wherein the yarn includes two or more plies twisted together in a twist pattern in which each plie of the two or more plies wraps at least three times around the other plies of the two or more plies per longitudinal inch of the yarn.

5. The knitted fabric of claim 3, wherein the cover ply is a flat yarn that includes a plurality of cover filaments.

6. The knitted fabric of claim 5, wherein the core ply includes a plurality of core filaments, the plurality of core filaments including less than 68 core filaments.

7. The knitted fabric of claim 6, wherein the plurality of core filaments are twisted around each other with a ply twist greater than or equal to three turns per longitudinal inch.

8. The knitted fabric of claim 5, wherein the cover ply has a width that is greater than five times a height of the cover ply.

9. The knitted fabric of claim 8, wherein the yarn has a linear mass density of greater than or equal to 300 denier.

10. The knitted fabric of claim 9, wherein each loop of the interconnecting loops in the repeating stitch pattern has a stitch length and the stitch length of each loop in the first course of the plurality of courses varies less than ten percent from other stitch lengths of other loops in the first course of the plurality of courses.

11. The knitted fabric of claim 10, wherein the stitch density includes at least twelve courses per inch.

12. The knitted fabric of claim 11, wherein the repeating stitch pattern comprises a Milano-type rib stitch pattern.

13. The knitted fabric of claim 11, wherein the repeating stitch pattern comprises an interlock stitch pattern.

14. The knitted fabric of claim 13, wherein the yarn includes two plies with linear mass densities of at least 150 denier that are twisted together and each ply includes at least 34 filaments.

15. A knitted fabric for use on a vehicle seat comprising:
a plurality of interconnected loops of yarn forming a repeating stitch pattern including a plurality of transversely-oriented courses and a plurality of longitudinally-oriented wales, wherein:
each loop of the plurality of loops in a first course of the plurality of courses is positioned in contact with an adjacent loop in the first course of the plurality of courses;
the yarn includes one or more plies, each ply having a ply twist of at least three turns per inch;
the yarn is characterized by an overall twist of at least two turns per inch; and
a stitch density of the knitted fabric is greater than twelve wales per inch.

* * * * *